United States Patent
Hachiya et al.

(10) Patent No.: US 11,421,115 B2
(45) Date of Patent: Aug. 23, 2022

(54) COMPOSITION FOR ELECTROLESS PLATING UNDERLYING MEMBRANE

(71) Applicant: IDEMITSU KOSAN CO., LTD., Chiyoda-ku (JP)

(72) Inventors: Satoshi Hachiya, Sodegaura (JP); Fumioki Fukatsu, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 77 days.

(21) Appl. No.: 16/628,415

(22) PCT Filed: Jul. 9, 2018

(86) PCT No.: PCT/JP2018/025933
§ 371 (c)(1),
(2) Date: Jan. 3, 2020

(87) PCT Pub. No.: WO2019/013179
PCT Pub. Date: Jan. 17, 2019

(65) Prior Publication Data
US 2020/0165468 A1   May 28, 2020

(30) Foreign Application Priority Data
Jul. 11, 2017   (JP) .............................. JP2017-135727

(51) Int. Cl.
| | |
|---|---|
| *C09D 5/24* | (2006.01) |
| *C09D 175/06* | (2006.01) |
| *C09D 179/02* | (2006.01) |
| *C23C 18/16* | (2006.01) |
| *C23C 18/38* | (2006.01) |
| *C09D 163/00* | (2006.01) |
| *C08L 79/02* | (2006.01) |
| *C09D 175/04* | (2006.01) |
| *C08L 75/06* | (2006.01) |
| *C08L 75/04* | (2006.01) |
| *C09D 175/08* | (2006.01) |
| *C08L 75/08* | (2006.01) |

(52) U.S. Cl.
CPC ................ *C09D 5/24* (2013.01); *C08L 75/04* (2013.01); *C08L 75/06* (2013.01); *C08L 75/08* (2013.01); *C08L 79/02* (2013.01); *C09D 163/00* (2013.01); *C09D 175/04* (2013.01); *C09D 175/06* (2013.01); *C09D 175/08* (2013.01); *C09D 179/02* (2013.01); *C23C 18/1641* (2013.01); *C23C 18/1651* (2013.01); *C23C 18/38* (2013.01)

(58) Field of Classification Search
None
See application file for complete search history.

(56) References Cited

U.S. PATENT DOCUMENTS 5,565,968 A * 10/1996 Sawa .................. G03G 15/0818
399/286

FOREIGN PATENT DOCUMENTS

| | | |
|---|---|---|
| EP | 0 457 180 A2 | 11/1991 |
| JP | 2002-26014 A | 1/2002 |
| JP | 2010-18842 A | 1/2010 |
| JP | 2013-1955 A | 1/2013 |
| JP | 2015-34317 A | 2/2015 |
| JP | 2015034317 A * | 2/2015 |
| WO | WO 2014/106949 A1 | 7/2014 |
| WO | WO 2015/019596 A1 | 2/2015 |

OTHER PUBLICATIONS

Machine Translation of Japan 2015--034317, first published in Japanese in 2015. (Year: 2015).*
Machine Translation of JP2015034317A Feb. 2015 p. 1-15 (Year: 2015).*
International Preliminary Report on Patentability and Written Opinion dated Jan. 23, 2020 in PCT/JO2018/025933, citing documents AO, AP and AQ therein, 7 pages.
International Search Report dated Sep. 25, 2018 in PCT/JP2018/025933, citing documents AO, AP and AQ therein, 2 pages.
Combined Chinese Office Action and Search Report dated Oct. 9, 2021 in Chinese Patent APplication No. 201880046370.5, citing document AO therein, 7 pages.

* cited by examiner

*Primary Examiner* — Robert T Butcher
(74) *Attorney, Agent, or Firm* — Oblon, McClelland, Maier & Neustadt, L.L.P.

(57) ABSTRACT

A composition for forming an electroless plating undercoat comprising: (A) a conductive polymer (B) one or more resins selected from the group consisting of a polyester polyol resin and a polyether polyol resin; and (C) a polyisocyanate compound.

22 Claims, 1 Drawing Sheet

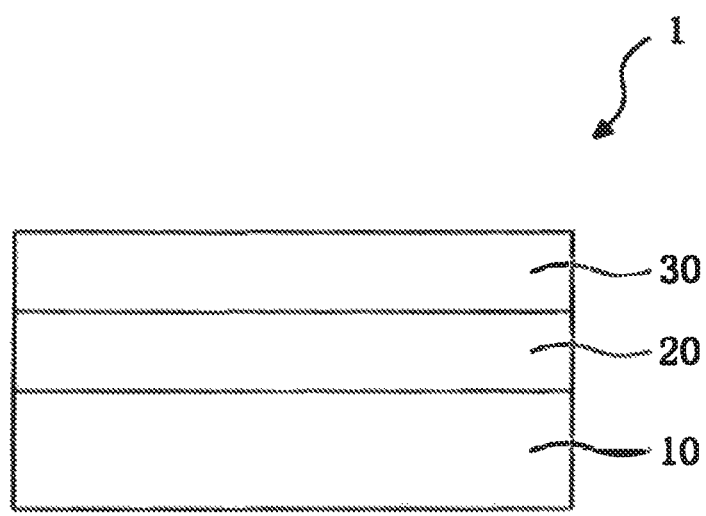

COMPOSITION FOR ELECTROLESS PLATING UNDERLYING MEMBRANE

TECHNICAL FIELD

The present invention relates to a composition for forming an electroless plating undercoat, an electroless plating undercoat, a plating stacked body, a method for manufacturing an electroless plating undercoat, and a method for manufacturing a plating stacked body.

BACKGROUND ART

The conductive polymer is used for an electrode and the like of an electrolytic capacitor, a backup battery of an electronic device, or a lithium ion battery used In a mobile phone or a notebook personal computer. Polyaniline as one of conductive polymers have, in addition to the electric properties thereof, advantages and properties that it can be synthesized relatively easily from inexpensive aniline and exhibit excellent stability to oxygen or the like in the conductive state.

In addition, many conductive polymers have a reducing power, and are also attracting attention as an electroless plating undercoat utilizing this characteristic.

While electroless plating is an excellent technique for forming a conductive layer on an insulating substrate, the prior art has limited the substrate. Although there is a technique that does not select a substrate, it does not sufficiently satisfy the characteristics such as the forming property, the adhesion property, and the heat resistance of the plating layer.

For example, Patent Documents 1 and 2 disclose a composition for forming an electroless plating undercoat having excellent molding workability, but the composition is excellent in moldability and therefore may not be sufficient for applications requiring heat resistance. Patent Document 3 discloses a coating layer in which conductive polymer fine particles for forming an electroless plating film and a binder are cured, but since the conductive polymer is fine particles, there are disadvantages in smoothness of the coating layer and in fineness of a pattern, that is, in formation of the plating layer. Patent Document 4 discloses a coating composition for electroless plating containing a palladium colloid (catalyst), but since the catalyst is present not only on the surface of the undercoat but also inside the undercoat, it is necessary to blend a large amount of an expensive catalyst to form a sufficient plating layer, resulting in high cost.

RELATED ART DOCUMENTS

Patent Documents

Patent Document 1: WO 20151019596 A1
Patent Document 2: JP-A-2015-034317
Patent Document 3: JP-A-2010-018842
Patent Document 4: JP-A-2013-001955

SUMMARY OF THE INVENTION

It is an object of the present invention to provide a composition for forming an electroless plating undercoat capable of forming an electroless plating undercoat excellent in the formability of the plating layer, adhesiveness with the substrate and the plating layer, and heat resistance.

As a result of intensive studies by the present inventors, it has been found that a composition for forming an electroless plating undercoat satisfying the above-mentioned characteristics can be obtained by combining a specific component with a conductive polymer, and the present invention has been completed.

According to the present invention, the following composition for forming an electroless plating undercoat and the like are provided.

1. A composition for forming an electroless plating undercoat comprising:
(A) a conductive polymer;
(B) one or more resins selected from the group consisting of a polyester polyol resin and a polyether polyol resin; and
(C) a polyisocyanate compound.
2. The composition for forming an electroless plating undercoat according to 1, wherein the ratio of the total amount of the component (B) and the component (C) based on the amount of a non-volatile component in the composition for forming an electroless plating undercoat is 8 to 90% by mass.
3. The composition for forming an electroless plating undercoat according to 1 or 2, wherein the molar ratio of an isocyanate group in the component (C) based on a hydroxyl group in the component (B) is 0.1 to 10.0.
4. The composition for forming an electroless plating undercoat according to any one of 1 to 3, wherein the component (C) is a blocked polyisocyanate compound.
5. The composition for forming an electroless plating undercoat according to any one of 1 to 4, further comprising a urethane resin.
6. The composition for forming an electroless plating undercoat according to 5, wherein the ratio of the amount of the component (C) based on the total amount of the component (A), the component (C), and the urethane resin is more than 5% by mass.
7. The composition for forming an electroless plating undercoat according to any one of 1 to 6, further comprising an epoxy resin.
8. The composition for forming an electroless plating undercoat according to any one of 1 to 7, wherein the component (A) is a substituted or unsubstituted polyaniline.
9. The composition for forming an electroless plating undercoat according to any one of 1 to 8, wherein the component (A) is a polyaniline complex in which a substituted or unsubstituted polyaniline is doped with a dopant.
10. The composition for forming an electroless plating undercoat according to 9, wherein the dopant is an organic acid ion generated from a sulfosuccinic acid derivative represented by the following formula (III).

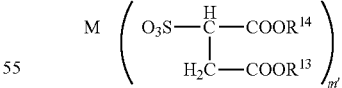

(In formula (III), M is a hydrogen atom, an organic radical, or an inorganic radical; m' is the valence of M; $R^{13}$ and $R^{14}$ are independently a hydrocarbon group or $—(R^{15}O)_rR^{16}$ group; $R^{16}$ is independently a hydrocarbon group or a silylene group; $R^{16}$ is a hydrogen atom, a hydrocarbon group, or $R^{17}{}_3Si—$ group; r is an integer of 1 or more; $R^{17}$ is independently a hydrocarbon group.)
11. The composition for forming an electroless plating undercoat according to 10, wherein the sulfosuccinic add derivative is a sodium di-2-ethylhexylsulfosuccinate.

12. The composition for forming an electroless plating undercoat according to any one of 1 to 11, further comprising a solvent.
13. An electroless plating undercoat obtained from the composition for forming an electroless plating undercoat according to any one of 1 to 12.
14. A plating stacked body comprising:
   a substrate;
   an electroless plating undercoat according to 13; and
   an electroless plating layer containing a metal,
   wherein the electroless plating layer and the electroless plating undercoat are in contact with each other.
15. The plating stacked body according to 14, wherein said metal is copper.
16. The plating stacked body according to 14 or 15, wherein the substrate is composed of a resin.
17. The plating stacked body according to 16, wherein the substrate is composed of a polycarbonate resin, a polyester resin, a polyimide resin, or a polyphenylene sulfide resin.
18. A method for manufacturing an electroless plating undercoat using the composition for forming an electroless plating undercoat according to any one of 1 to 12.
19. A method of manufacturing a plating stacked body comprising the steps of.
(i) forming an electroless plating undercoat on a substrate using the composition for forming an electroless plating undercoat according to any one of 1 to 12; and
(II) forming an electroless plating layer containing a metal on the electroless plating undercoat.
20. The method for manufacturing a plating stacked body according to 19, wherein In the step (ii), the electroless plating undercoat is made to support palladium, and then the electroless plating undercoat on which palladium is supported is contacted with an electroless plating solution to form the electroless plating layer.
21. The method for manufacturing a plating stacked body according to 20, wherein the palladium is supported on the electroless plating undercoat by contacting the electroless plating undercoat with a palladium chloride solution.
22. The method for manufacturing a plating stacked body according to 20 or 21, wherein the electroless plating solution contains one or more metals selected from the group consisting of Cu, Ni, Au, Pd, Ag, Sn, Co, and Pt.

According to the present invention, it is possible to provide a composition for forming an electroless plating undercoat capable of forming an electroless plating undercoat excellent in the formability of the plating layer, adhesiveness with the substrate and the plating layer, and heat resistance.

BRIEF DESCRIPTION OF THE DRAWINGS

The FIGURE is a schematic diagram showing the layer configuration of one embodiment of the plating stacked body of the present invention.

MODE FOR CARRYING OUT THE INVENTION

[Composition for Forming Electroless Plating Undercoat]
The composition for forming an electroless plating undercoat of the present invention contains the following components (A) to (C).
   (A) a conductive polymer
   (B) one or more resins selected from the group consisting of polyester polyol resins and polyether polyol resins
   (C) a polyisocyanate compound Electroless plating is a method of plating metal having autocatalytic action using a reducing agent without performing electrolysis, and In the case of electroless copper plating, for example, is a chemical process in which copper ions in a solution are reduced using a reducing agent such as formaldehyde to precipitate a metallic copper film, and the precipitated metallic copper becomes an autocatalyst to further metallize and precipitate copper ions. The composition of the present invention is used for forming a undercoat of an electroless plating layer.

The composition for forming an electroless plating undercoat of the present invention has the following effects by having the above-mentioned components. First, an electroless plating undercoat excellent in the forming property of a plating layer can be formed. That is, since the conductive polymer is dissolved in the composition at the molecular level and the dispersion state of the conductive polymer is kept fine after the formation of the plating undercoat, a plating undercoat having excellent uniformity and smoothness can be obtained, and plating failure hardly occurs even in a fine pattern. Next, the electroless plating undercoat obtained from the composition of the present invention has high adhesiveness to the substrate and the plating layer. Further, the plating undercoat exhibits excellent heat resistance.

In addition, it is possible to form a plating layer by applying an expensive plating catalyst only to the surface of the plating undercoat, and it is possible to form a plating layer only in a necessary portion by pattern printing the plating undercoat. Therefore, there is an advantage that the plating stacked body can be formed at low cost because the etching step required for pattern formation is unnecessary in, for example, a copper dad stacked body.

Each component will be described below. In the case of "component (X)", for example, even when a commercially available reagent is used, only a compound corresponding to the component (X) in the reagent is referred to, and other components (solvent, etc.) in the reagent are not included.

[(A) Component Conductive Polymer]
Conductive polymers include T conjugated polymers such as a substituted or unsubstituted polyaniline, a substituted or unsubstituted polypyrrole, and a substituted or unsubstituted polythiophene. Specific examples include π conjugated polymer complexes in which the r conjugated polymer is doped with a dopant, which include polyaniline complexes in which a substituted or unsubstituted polyaniline is doped with a dopant, polypyrrole complexes in which a substituted or unsubstituted polypyrrole is doped with a dopant, and polythiophene complexes in which a substituted or unsubstituted polythiophene is doped with a dopant; polyaniline complexes in which a substituted or unsubstituted polyaniline is doped with a dopant are preferred.

The case where a substituted or unsubstituted polyaniline is used as the conductive polymer will be described below.

The weight average molecular weight (hereinafter, referred to as a "molecular weight") of the polyaniline is preferably 20,000 or more. The molecular weight is preferably 20,000 to 500.000, more preferably 20,000 to 300,000, and still more preferably 20,000 to 200,000. The weight average molecular weight is not the molecular weight of the polyaniline complex, but the molecular weight of the polyaniline.

The molecular weight distribution is preferably 1.5 or more and 10.0 or less. With respect to conductivity, it is preferable that the molecular weight distribution is small, but with respect to solubility in a solvent, it is sometimes preferable that the molecular weight distribution is wide.

Molecular weights and molecular weight distributions are measured with polystyrene conversion by gel permeation chromatography (GPC).

Substitutions of substituted polyanilines include, for example, straight or branched chain hydrocarbon groups such as methyl, ethyl, hexyl, octyl, etc.; alkoxy groups such as methoxy, ethoxy, etc.; aryloxy groups such as phenoxy, etc.; halogenated hydrocarbons such as trifluoromethyl (—CF), etc.

The polyaniline is preferably unsubstituted polyaniline with respect to versatility and economy.

The substituted or unsubstituted polyaniline is preferably a polyaniline obtained by polymerization in the presence of an acid containing no chlorine atoms. The acid containing no chlorine atom is, for example, an acid consisting of atoms belonging to Group 1 to Group 16 and Group 18. Specific examples include a phosphoric acid. The polyaniline obtained by polymerization In the presence of acid containing no chlorine atom includes a polyaniline obtained by polymerization in the presence of a phosphoric acid.

The polyaniline obtained in the presence of an acid containing no chlorine atoms can have a lower chlorine amount of the polyaniline complex.

The dopants of the polyaniline complex include, for example, Brönsted acids or Brönsted acid ions arising from salts of Brönsted acids, preferably organic acids or organic acid ions arising from salts of organic acids, and more preferably organic acid ions arising from compounds represented by the following formula (I) (proton donors).

In the present invention, when the dopant is expressed as a specific acid and when the dopant is expressed as a specific salt, each of them is assumed to be doped with a specific acid or a specific acid ion generated from a specific salt into the above-mentioned π conjugated polymer.

$$M(XAR_n)_m \quad (I)$$

M in the formula (I) is a hydrogen atom, an organic free radical group or an inorganic free radical group.

Examples of the organic free radical include a pyridinium group, an imidazolium group, and an anilinium group. Examples of the inorganic free radical include lithium, sodium, potassium, cesium, ammonium, calcium, magnesium, and iron.

X in formula (I) is an anionic group, for example, —$SO_3^-$ group, —$PO_3^{2-}$ group, —$PO_2(OH)^-$ group, —$OPO_3^{2-}$ group, —$OPO_2(OH)^-$ group, —$COO^-$ group, and the like, preferably —$SO_3^-$ group.

A in formula (I) is a substituted or unsubstituted hydrocarbon group (having, for example, 1 to 20 carbon atoms).

The hydrocarbon group is a chain or cyclic saturated aliphatic hydrocarbon group, a chain or cyclic unsaturated aliphatic hydrocarbon group, or an aromatic hydrocarbon group.

The chain-like saturated aliphatic hydrocarbon group includes a straight or branched alkyl group (having, for example, 1 to 20 carbon atoms). Examples of the cyclic saturated aliphatic hydrocarbon group include cycloalkyl groups (having, for example, 3 to 20 carbon atoms) such as cyclopentyl group, cyclohexyl group, cycloheptyl group, and cyclooctyl group. The cyclic saturated aliphatic hydrocarbon group may be one in which a plurality of cyclic saturated aliphatic hydrocarbon groups is condensed. A norbornyl group, an adamantyl group and a condensed adamantyl group can be given, for example. Chain unsaturated aliphatic hydrocarbons (having, for example, 2 to 20 carbon atoms) include straight or branched alkenyl groups. The cyclic unsaturated aliphatic hydrocarbon group (having, for example, 3 to 20 carbon atoms) includes a cyclic alkenyl group. Examples of the aromatic hydrocarbon group (having, for example, 6 to 20 carbon atoms) include a phenyl group, a naphthyl group, and an anthracenyl group.

When A is a substituted hydrocarbon group, the substituent is an alkyl group (having, for example, 1 to 20 carbon atoms), a cycloalkyl group (having, for example, 3 to 20 carbon atoms), a vinyl group, an allyl group, an aryl group (having, for example, 6 to 20 carbon atoms), an alkoxy group (having, for example, 1 to 20 carbon atoms), a halogen atom, a hydroxy group, an amino group, an imino group, a nitro group, a silyl group, or an ester bond-containing group.

R in formula (I) is bonded to A and is a substituent represented by —H, —$R^1$, —$OR^1$, —$COR^1$, —$COOR^1$, —(C=O)—($COR^1$), or —C=O)—($COOR^1$), and $R^1$ is a hydrocarbon group, silyl group, alkylsilyl group, —($R^2O$)x-$R^3$ group, or —($OSiR^3{}_2$)x-$OR^3$ group), which may contain a substituent. $R^2$ is an alkylene group, $R^3$ is a hydrocarbon group, and x is an integer of 1 or more. When x is 2 or more, the plurality of $R^2$ may independently be the same or different, and the plurality of $R^3$ may independently be the same or different.

The hydrocarbon groups (having, for example, 1 to 20 carbon atoms) for $R^1$ includes a methyl group, an ethyl group, a butyl group, a pentyl group, a hexyl group, a heptyl group, an octyl group, a nonyl group, a decyl group, a dodecyl group, a pentadecyl, an eicosanyl group, and the like. The hydrocarbon group may be linear or branched.

The substituent group of the hydrocarbon group is an alkyl group (having, for example, 1 to 20 carbon atoms), a cycloalkyl group (having, for example, 3 to 20 carbon atoms), a vinyl group, an allyl group, an aryl group (having, for example, 6 to 20 carbon atoms), an alkoxy group having, for example, 1 to 20 carbon atoms), a halogen group, a hydroxy group, an amino group, an imino group, a nitro group, or an ester bond-containing group. The hydrocarbon group for $R^3$ is the same as that for $R^1$.

Examples of the alkylene group (having, for example, 1 to 20 carbon atoms) for $R^2$ include a methylene group, an ethylene group, a propylene group, and the like.

In the formula (I), n is an integer of 1 or more. When n is 2 or more, a plurality of R may independently be the same or different.

m in formula (I) is the valence of M He valence of X.

As the compound represented by the formula (I), dialkylbenzenesulfonic acid, dialkylnaphthalenesulfonic acid or a compound having two or more ester bonds is preferable.

As the compound containing two or more ester bonds, a sulfophthalic acid ester or a compound represented by the following formula (II) is more preferable.

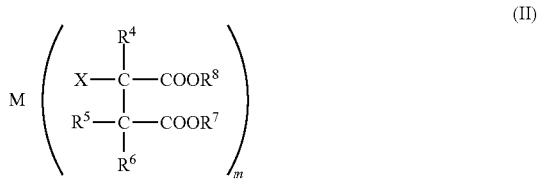

In formula (II), M and X are the same as those in formula (I). As X, a —$SO_3^-$ group is preferable.

$R^4$, $R^5$ and $R^6$ are independently a hydrogen atom, a hydrocarbon group or $R^9{}_3Si$— group. Each of the three $R^9$ is independently a hydrocarbon group.

When $R^4$, $R^5$ and $R^6$ are hydrocarbon groups, examples of the hydrocarbon group include a straight or branched alkyl group having 1 to 24 carbon atoms, an aryl group containing an aromatic ring (having, for example, 6 to 20 carbon atoms), an alkylaryl group (having, for example, 7 to 20 carbon atoms), and the like.

The hydrocarbon group for $R^9$ is same as those for $R^4$, $R^5$ and $R^6$.

$R^7$ and $R^8$ of formula (II) are independently a hydrocarbon group or —$(R^{10}O)_q$—$R^{11}$) group. $R^{10}$ is a hydrocarbon group or a silylene group, $R^{11}$ is a hydrogen atom, a hydrocarbon group or $R^{12}{}_3Si$—, and q is an integer of 1 or more. Each of the three $R^{12}$ is independently a hydrocarbon group.

When $R^7$ and $R^8$ are hydrocarbon groups, hydrocarbon groups include straight or branched alkyl groups having 1 to 24 carbon atoms, preferably 4 or more carbon atoms, aryl groups containing aromatic rings (having, for example, 6 to 20 carbon atoms), alkylaryl groups (having, for example, 7 to 20 carbon atoms), and the like, and specific examples include butyl groups, pentyl groups, hexyl groups, octyl groups, decyl groups, and the like, all of which are straight or branched.

The hydrocarbon group in $R^7$ and $R^8$ when $R^{10}$ is a hydrocarbon group is, for example, a straight or branched alkylene group having 1 to 24 carbon atoms, an arylene group containing an aromatic ring (having, for example, 6 to 20 carbon atoms), an alkylarylene group (having, for example, 7 to 20 carbon atoms), or an arylalkylene group (having, for example, 7 to 20 carbon atoms). The hydrocarbon groups in $R^7$ and $R^8$ in the case where $R^{11}$ and $R^{12}$ are hydrocarbon groups are the same as those for $R^4$, $R^5$ and $R^6$, and q is preferably 1 to 10.

Specific examples of the compound represented by formula (II) when $R^{11}$ and $R^{12}$ are —$(R^{10}O)_q$—$R^{11}$ group are two compounds represented by the following formulas:

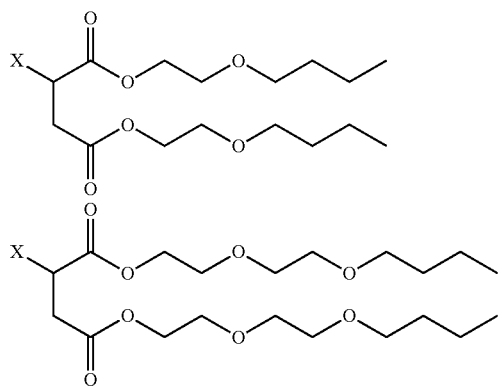

wherein X is the same as that in the formula (I).

It is further preferred that the compound represented by the above formula (II) is a sulfosuccinic acid derivative represented by the following formula (III).

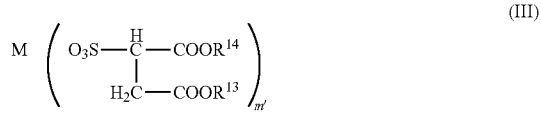

In formula (III), M is the same as that for formula (I). m' is a valence of M.

$R^{13}$ and $R^{14}$ are independently a hydrocarbon group or —$(R^{15}O)_r$—$R^{16}$ group. $R^{15}$ is a hydrocarbon group or a silylene group, $R^{16}$ is a hydrogen atom, a hydrocarbon group or $R^{17}{}_3Si$— group, and r is an integer of 1 or more. Each of the three $R^1$ is independently a hydrocarbon group. When r is 2 or more, the plurality of $R^{15}$ may be the same or different.

The hydrocarbon groups when $R^{13}$ and $R^{14}$ are hydrocarbon groups are the same as those for $R^7$ and $R^8$.

In $R^{13}$ and $R^{14}$, when $R^{15}$ is a hydrocarbon group, the hydrocarbon group is the same as that for above $R^{10}$. In addition, in $R^{13}$ and $R^{14}$, when $R^{16}$ and $R^{17}$ are hydrocarbon groups, the hydrocarbon groups are the same as those for $R^4$, $R^5$ and $R^6$.

It is preferable that r is 1 to 10.

Specific examples In the case where $R^{13}$ and $R^{14}$ are —$(R^{15}O)_r R^{16}$ groups are the same as —$(R^{10}O)_q$—$R^{11}$ for $R^7$ and $R^8$.

The hydrocarbon for $R^{13}$ and $R^{14}$ is the same as that for $R^7$ and $R^8$. A butyl group, a hexyl group, a 2-ethylhexyl group, and a decyl group are preferable.

As the compound represented by formula (I), di-2-ethylhexylsulfosuccinic acid and sodium di-2-ethylhexylsulfosuccinate (aerosol OT) are preferable.

It can be confirmed by ultraviolet, visible, near infrared spectroscopy or X-ray photoelectron spectroscopy that the dopant of the polyaniline complex is doped into the substituted or unsubstituted polyaniline, and the dopant can be used without any particular limitation on the chemical structure as long as the dopant has sufficient acidity to generate a carrier in the polyaniline.

The doping ratio of the dopant to the polyaniline is preferably 0.35 or more and 0.65 or less, more preferably 0.42 or more and 0.60 or lees, still more preferably 0.43 or more and 0.57 or less, and particularly preferably 0.44 or more and 0.55 or less.

The doping rate is defined as (the number of moles of dopant doped into the polyaniline)(the number of moles of monomer units of the polyaniline). For example, a polyaniline complex containing unsubstituted polyaniline and a dopant having a doping ratio of 0.5 means that two monomer unit molecules of polyaniline are doped with one dopant.

The doping rate can be calculated if the number of moles of dopant and polyaniline monomer units in the polyaniline complex can be measured. For example, when the dopant is an organic sulfonic acid, the number of moles of sulfur atoms derived from the dopant and the number of moles of nitrogen atoms derived from the monomer unit of polyaniline are quantified by an organic element analysis method, and the doping ratio can be calculated by taking the ratio of these values. Provided that, the method of calculating the doping rate is not limited to this means.

The polyaniline complex may or may not further comprise phosphorus.

When the polyaniline complex contains phosphorus, the phosphorus content is, for example, 10 ppm by mass or more and 5000 ppm by mass or less.

The phosphorus content can be measured by ICP emission spectroscopy.

In addition, it is preferable that the polyaniline complex does not contain a Group 12 element (for example, zinc) as an impurity.

The polyaniline complex can be produced by well-known production methods. For example, it can be prepared by chemical oxidative polymerization of a substituted or unsubstituted aniline in a solution containing a proton donor, a phosphoric acid, and an emulsifier different from the proton donor and having two liquid phases. It can also be prepared by adding an oxidative polymerization agent to a solution containing a substituted or unsubstituted aniline, a proton donor, a phosphoric acid, and an emulsifier different from the proton donor and having two liquid phases.

The "solution having two liquid phases" means a state where two incompatible liquid phases are present in a solution. For example, it means a state in which "a phase of a high polarity solvent" and "a phase of a low polarity solvent" are present in the solution.

The "solution having two liquid phases" also includes a state in which one of the liquid phases is a continuous phase and the other liquid phase is a dispersed phase. For example, it includes a state in which the "phase of the high polarity solvent" is a continuous phase and the "phase of the low polarity solvent" is a dispersed phase, and a state in which the "phase of the low polarity solvent" is a continuous phase and the "phase of the high polarity solvent" is a dispersed phase.

Water is preferable as the high polarity solvent used in the method for producing the polyaniline complex, and aromatic hydrocarbons such as a toluene and a xylene are preferable as the low polarity solvent.

The proton donor is preferably a compound represented by formula (I) above.

As the emulsifier, any of an ionic emulsifier in which a hydropholic part is ionic and a non-ionic emulsifier in which a hydropholic part is non-ionic can be used, and 1 or 2 or more emulsifiers may be used in a mixture.

The oxidizing agent used in the chemical oxidation polymerization may be a peroxide such as sodium persulfate, potassium persulfate, ammonium persulfate, hydrogen peroxide, etc.; ammonium dichromate, ammonium perchlorate, potassium iron (III) sulfate. Iron (III) trichloride, manganese dioxide, iodic acid, potassium permanganate or iron paratoluenesulfonate, etc., and is preferably a persulfate such as ammonium persulfate.

These may be used alone or in combination of two or more kinds.

The molecular weight of the polypyrrole, the molecular weight distribution of the polypyrrole, and substituents of the substituted polypyrrole are the same as those of the above-mentioned polyaniline.

The dopant of the polypyrrole composite is not particularly limited, and an acceptor dopant which is generally suitably used for a conductive polymer comprising a polymer of pyrrole and/or a pyrrole derivative can be appropriately used.

Representative examples include sulfonic acids such as polystyrene sulfonic acid, paratoluenesulfonic acid, methanesulfonic acid, trifluoromethanesulfonic acid, anthraquinonesulfonic acid, benzenesulfonic acid, naphthalene sulfonic acid, sulfosalicylic acid, dodecylbenzenesulfonic acid, allylsulfonic acid, etc., halogens such as perchloric acid, chlorine, bromine, etc., Lewis acid, protic acid, etc. They may be in acid form or in salt form. Preferred with respect to solubility of monomers are tetrabutylammonium perchlorate, tetraethylammonium perchlorate, tetrabutylammonium tetrafluoroborate, tetrabutylammonium trifluororethanesulfonate, trifluorosulfonimidotetrabutylammonium, dodecylbenzenesulfonic acid, paratoluene sulfonic acid, and the like.

The amount of the dopant used when the dopant is used is preferably an amount of 0.01 to 0.3 molecules of the dopent per unit of the pyrrole polymer. If it is less than 0.01 molecule, the amount of dopant required to form a sufficient conductive path is insufficient, and it is difficult to obtain high conductivity. On the other hand, since the doping ratio does not improve even if the doping ratio exceeds 0.3 moleculars, the addition of dopants exceeding 0.3 molecules is not economically preferable. Here, the pyrrole polymer unit refers to a repeating portion corresponding to one molecule of the monomer of the pyrrole polymer obtained by polymerizing the pyrrole monomer.

The molecular weight of the polythiophene, the molecular weight distribution of the polythiophene, and substituents of the substituted polythiophene are the same as those of the above-mentioned polyaniline. As the substituted polythiophene, polyethylenedioxythiophene (PEDOT) is preferable.

Examples of the dopant of the polythiophene complex include an organic acid ion of an anionic surfactant, an inorganic acid ion, and the like. Examples of the organic acid ions of the anionic surfactant include sulfonic add-based ions, esterified sulfate ions, and the like. Examples of the inorganic acid ion include sulfate ion, halogen ion, nitrate ion, perchlorate ion, hexacyanoferrate ion, phosphate ion, phosphomolybdate ion, and the like.

The amount of the component (A) in the composition for forming an electroless plating undercoat of the present invention is preferably 30 to 85% by mass, more preferably 30 to 80% by mass, still more preferably 36 to 70% by mass, particularly preferably 40 to 70% by mass, based on the total of the components (A) to (C).

[(B) Component: One or More Resins Selected from the Group Consisting of Polyester Polyol Resins and Polyether Polyol Resins]

The polyester polyol resin is usually obtained by polymerizing a polyol and a polyvalent carboxylic acid.

Examples of polyols include neopentyl glycol, ethylene glycol, diethylene glycol, propylene glycol, 1,6-hexanediol, 1,4-butanediol, 1,9-nonanediol, 1,10-decanediol, 3-methylpentanediol, 2,4-diethylpentanediol, tricyclodecanedimethanol, 1,4-cyclohexanedimethanol, 1,2-cyclohexanedimethanol, 1,3-cyclohexanedimethanol, cyclohexanediol, hydrogenated bisphenol A, trimethylolpropane, pentaerythritol, and the like.

Examples of the polyvalent carboxylic acid include malonic acid, phthalic acid, terephthalic acid, isophthalic acid, tetrahydrophthalic acid, methyltetrahydrophthalic acid, hexahydrophthalic acid, methyl hexahydrophthalic acid, succinic acid, glutaric acid, hexachloroendomethylenetetrahydrophthalic acid, endomethylenetetrahydrophthalic acid, endomethylenehexahydrophthalic acid, adipic acid, sebacic acid, azelineic acid, dimeric acid, decanedicarboxylic acid, cyclohexanedicarboxylic acid, trimellitic acid, pyromellitic acid, trimesic acid, cyclopentanedicarboxylic acid, and the like.

The weight average molecular weight of the polyester polyol resin is preferably 2,000 to 50,000. The weight average molecular weight is measured by the GPC method.

The glass transition temperature (Tg) of the polyester polyol resin is preferably 5 to 90° C. Tg is measured by DSC (Differential Scanning Calorimetry).

The hydroxyl value of the polyester polyol resin is preferably 2 to 70 mg KOH/g. The hydroxyl value is calculated from the mass in milligrams of potassium hydroxide required to neutralize the acetic acid formed in a reaction wherein the 1 g of polyester polyol resins with acetic anhydride are reacted.

As the polyether polyol resin, for example, polyethylene glycol, polypropylene glycol, polytetramethylene glycol, poly1-methylbutylene glycol, or the like can be used.

Also, a polyether polyol obtained by copolymerizing a monomer for synthesizing the above polyether polyol and a polyhydric alcohol such as glycerin, trimethylolpropane, pentaerythritol, sorbitol, triethanolamine or the like in a range not gelling can be used.

The weight average molecular weight of the polyether polyol resin is preferably 400 to 10,000.

The hydroxyl value of the polyether polyol resin is preferably 20 to 500 mg KOH/g.

The method for measuring the weight average molecular weight and the hydroxyl value of the polyether polyol resin is the same as that described for the polyester polyol resin.

The polyester polyol resin or the polyether polyol resin may be used alone or the polyester polyol resin and the polyether polyol resin may be used in combination. One type of each resin may be used alone, or two or more types may be used in combination.

Among the polyol resins, for example, when polyvinyl acetal is used, the heat resistance of the electroless plating undercoat may be lowered due to decomposition of the resin by heating, but the polyester polyol resin and/or polyether polyol resin described above has no such concern, and it becomes possible to manufacture an electroless plating undercoat having excellent heat resistance.

The amount of the component (B) in the composition for forming an electroless plating undercoat of the present invention is preferably 10 to 65% by mass, more preferably 15 to 60% by mass, and still more preferably 20 to 60% by mass, based on the total of the components (A) to (C).

[(C) Component: Polyisocyanate Compound]

The polyisocyanate compound is a compound having two or more isocyanate groups (—NCO groups), and may be a raw material of polyurethane.

In the composition for forming an electroless plating undercoat of the present invention, excellent heat resistance can be imparted to the plating undercoat by sufficiently crosslinking the component (B) with the component (C).

Polyisocyanates are, for example, compounds represented by R'(—NCO)$_o$, wherein R' is an aliphatic hydrocarbon (having, for example, 1 to 20 carbon atoms) such as methyl, ethyl, propyl, butyl, or the like, or an aromatic hydrocarbon (having, for example, 6 to 20 carbon atoms) such as a benzene ring, a naphthalene ring, or the like, and o is an integer of 2 or more.

As the polyisocyanate compound, it is preferable to use a blocked polyisocyanate.

Normally, —NCO group is very reactive, so —NCO group is blocked to form a blocked polyisocyanate so that its reactivity can be suppressed and controlled. Blocked polyisocyanates block reactive groups, such as —NCO groups, in the system, thereby inhibiting the reaction, eliminating the blocking groups by heating, and initiating the reaction.

Examples of the polyisocyanate compound include MF-K60B, MF-B60B, 17B-60P, TPA-100, TKA-100, P301-75E, 24A-100 manufactured by Asahi Kasei Corporation, and the like based on HDI (hexamethylene diisocyanate). In addition, D-550, DB-980K manufactured by DIC Ltd., Colonate BI-301, Colonate 2507 manufactured by Tosoh Corporation, and the like are also mentioned.

The curing temperature of the polyisocyanate compound is preferably 80° C. or more, more preferably 90 to 180° C. When the curing temperature of the polyisocyanate is in the above range, the heat resistance of the plating undercoat can be improved.

In the case of a blocked polyisocyanate, the curing temperature is the temperature at which the blocking groups are eliminated.

The amount of the component (C) in the composition for forming an electroless plating undercoat of the present invention varies depending on the chemical structure of the component (B), but it is preferably 0.5 to 30% by mass, more preferably 1 to 25% by mass, still more preferably 1 to 20% by mass, based on the total of the components (A) to (C). In addition, for example, 6 to 30% by mass, 7 to 30% by mass, 8 to 30% by mass based on the total of the components (A) to (C) may be used.

When the composition for forming an electroless plating undercoat of the present invention contains a urethane resin described later, the proportion of the component (C) based on the total of the component (A), the component (C), and the urethane resin may be more than 5% by mass, 6% by mass or more, or 7% by mass or more.

[Quantitative Relationship Between (B) Component and (C) Component]

In the composition for forming an electroless plating undercoat of the present invention, the proportion of the total of the component (B) and the component (C) based on the nonvolatile component in the composition is preferably 8 to 90% by mass, more preferably 10 to 90% by mass, still more preferably 10 to 70% by mass, and particularly preferably 20 to 60% by mass. Within this range, the cross-linking structure occupies a sufficient proportion in the plating undercoat, and the conductive polymer can retain the catalyst necessary for forming the plating layer, so that it is excellent in both heat resistance and plating precipitation properties.

The non-volatile component is a component that remains in the composition after the volatile component is removed when the composition is heated and/or decompressed to the extent that the compounded component in the composition does not cause a chemical change, and is usually a component other than a solvent in the composition.

The molar ratio (NCO/OH ratio) of the isocyanate group in the component (C) based on the hydroxyl group in the component (B) is preferably 0.1 to 10.0, more preferably 0.6 to 8.0, and still more preferably 0.6 to 5.5.

The NCO/OH ratio can be calculated by the following equation.

$$\text{NCO/OH ratio} = X/Y$$

In the formula, X is that the number of isocyanate groups per unit weight of compound having isocyanate groups times the weight of the formulation. Y is that the number of hydroxyl groups per unit mass of the compound having hydroxyl groups times the blending mass.

When a blocked polyisocyanate compound is used as a component (C), the isocyanate group is regenerated by heating, and reacts with the hydroxyl group in the electroless plating undercoat composition to form a bond. Molecules having two or more polymerizable groups in one molecule react with each other to form a polymer, and compounds having three or more isocyanate groups and/or hydroxyl groups react with each other to form a three-dimensional cross-linking structure.

In order to sufficiently proceed the cross-linking reaction, it is preferable that the number of isocyanate groups and the number of hydroxyl groups In the composition are substantially equal to each other. However, in the case where a component which does not contribute to the crosslinking reaction of the component (A) and the like is included, the collision probability between the isocyanate group and the hydroxyl group in the undercoat is lowered, and the cross-linking reaction may not proceed sufficiently.

When the polyester polyol resin and/or the polyether polyol resin are compared with the polyisocyanate compound, the polyisocyanate compound has a lower molecular weight and higher motility in many cases. Therefore, in order to increase the collision probability of both, it is preferable to increase the proportion of the polyisocyanate compound. When the isocyanate group is decomposed by water or the like, an amino group is generated. Since the amino group reacts with the remaining isocyanate group, even if the proportion of the polyisocyanate compound is large, the cross-linking reaction is less inhibited.

[Solvent]

The solvent used in the composition for forming the electroless plating undercoat of the present invention is not particularly limited, but, for example, methanol, ethanol, isopropyl alcohol, 2-methoxyethanol, 2-ethoxyethanol, diacetone alcohol, 3-methoxy-1-butanol, 3-methoxy-3-methyl-1-butanol, ethylcarbitol, acetone, methyl ethyl ketone, methyl isobutyl ketone, cyclohexanone, isophorone, sorbentonafsa, tetrahydrofuran, diethyl ether, n-butyl acetate, n-butanol, propylene glycol monomethyl ether acetate, γ-butyrolactone, tetralin, 2-butoxy-2-ethoxyethanol, dipropylene glycol monopropyl ether, 1,3-dimethylimidazolidinone, N-methylpyrrolidone, etc. can be given. These may be used alone or in combination of two or more.

The amount of the solvent in the composition for forming an electroless plating undercoat of the present invention is preferably 50 to 2000 parts by mass, more preferably 100 to 1000 parts by mass, and still more preferably 100 to 600 parts by mass, based on 100 parts by mass of the total of the components (A) to (C).

In the composition for forming an electroless plating undercoat of the present invention, for example, 90% by mass or more, 95% by mass or more, 98% by mass or more, 99% by mass or more, 99.5% by mass or more, 99.9% by mass or more, or 100% by mass, other than the solvent, may be consisting of the components (A), (B), and (C).

In the composition for forming an electroless plating undercoat of the present invention, for example, 90% by mass or more, 95% by mass or more, 98% by mass or more, 99% by mass or more, 99.5% by mass or more, 99.9% by mass or more, or 100% by mass, other than the solvent, may be consisting of (A) component, (B) component, and (C) component, and one or more components (for example, urethane resin) among other components described later.

The composition for forming an electroless plating undercoat of the present invention may contain, for example, 1% by mass or less, 0.5% by mass or less, 0.1% by mass or less of the polyvinyl acetal resin, or may not contain the polyvinyl acetal resin.

[Urethane Resin]

The composition for forming an electroless plating undercoat of the present invention may further contain a urethane resin. As the urethane resin, for example, a resin obtained by reacting polyisocyanate and polyol can be used.

The polyisocyanate is not particularly limited as long as it is a compound having at least two or more isocyanate groups, and a known compound can be used.

Specifically, for example, aromatic isocyanates such as TDI (trilene diisocyanate) based, MDI (diphenylmethane diisocyanate) based, XDI (xylylene diisocyanate) based, NDI (naphthylene 1,5-diisocyanate) based, TMXDI (tetramethylene xylylene diisocyanate) based, cycloaliphatic isocyanate such as IPDI (isophorone diisocyanate) based, H12MDI (hydrogenated MDI, dicyclohexylmethane diisocyanate) based, H6XDI (hydrogenated XDI) based, HDI (hexamethylene diisocyanate) based, DDI (dimeric acid diisocyanate) based, NBDI (norbornene diisocyanate) based, and the like can be given. These may be used alone or in combination of two or more.

Examples of the polyol include polyether polyols such as polyoxyethylene glycol, polyoxypropylene glycol, polyoxytetramethylene glycol, polyester polyols such as polyethylene adipate, polyethylene-butylene adipate, polycaprolactone, acrylic polyol, polycarbonate polyol, polydimethylsiloxane-ethylene oxide adduct, polydimethylsiloxane-propylene oxide adduct, castor oil, and the like. These may be used alone or in combination of two or more.

Since the urethane resin is soft and extensible, it is possible to suppress the undercoat from becoming too brittle due to the cross-linking structure.

Specific examples of the urethane resin include a MAU series such as MAU1008, MAU4308HV, MAU5022, MAU9022 (manufactured by Dainichi Seika Kogyo Co., Ltd.), a ASPU series such as ASPU360, ASPU112, ASPU116, ASPU121 (manufactured by DIC Co., Ltd.), a Hydran series such as Hydran AP-20, AP-30F, AP-40F, WLS-213 (manufactured by DIC Co., Ltd.), a Eucoat series such as Eucoat UX-150, UX-200, UX-310, UWS-145 (manufactured by SANYO Chemical Co., Ltd.), an Acrite series such as Acrite WBR-2018, WBR-016U, WEM-3008 (manufactured by Taiaei Fine Chemical Co., Ltd.), and PTG-RSN (manufactured by DIC Graphics Co., Ltd.).

In the MAU series, a polar group such as an amino group or a carboxyl group can be introduced, and compatibility with various binders and adhesiveness can be improved. By having a reactive group, a flexible coating film can be formed even after curing.

The ASPU series is a solvent-based, and it is possible to produce a flexible and tough film by having a reactive group as well as improving weather resistance, abrasion property, and bendability. The Hydran series is water-based and can be dissolved in various solvents to have performance equivalent to that of the ASPU series.

Acrite series are urethane emulsions that do not have reactive groups. It can be used In water-based paints.

The urethane resin usually has a structure represented by the following formula.

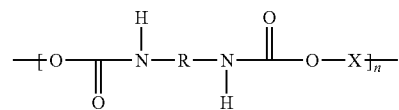

In the formula, R and X are independently a substituted or unsubstituted divalent aromatic hydrocarbon group, a substituted or unsubstituted divalent aliphatic hydrocarbon group, or a divalent group in which one or more substituted or unsubstituted divalent aromatic hydrocarbon groups and one or more substituted or unsubstituted divalent aliphatic hydrocarbon groups are bonded in any order, derived from a monomer in synthesizing a urethane resin.

Examples of the divalent aromatic hydrocarbon group include an aromatic hydrocarbon group having 6 to 50 ring carbon atoms. Specific examples include a phenylene group, a naphthylene group, and the like.

Examples of the divalent aliphatic hydrocarbon group include a linear aliphatic hydrocarbon group having 6 to 50 carbon atoms, a branched aliphatic hydrocarbon group having 6 to 50 carbon atoms, and the like. Specific examples include a methylene group, an ethylene group, a propylene group, and the like.

Examples of the divalent group in which one or more substituted or unsubstituted divalent aromatic hydrocarbon groups and one or more substituted or unsubstituted divalent aliphatic hydrocarbon groups are bonded in any order include a group in which a phenylene group and a methylene group are bonded, a group in which a naphthylene group and an ethylene group are bonded, and the like.

Examples of the substituent in the case of having a substituent include a hydroxyl group, a carboxyl group, a nitro group, a cyano group, an amino group, and the like.

The urethane resin may be used alone or in combination of two or more.

The amount of the urethane resin in the composition for forming an electroless plating undercoat of the present invention is preferably 1 to 100 parts by mass, more preferably 5 to 50 parts by mass, based on 100 parts by mass of the total of the components (A) to (C).

[Epoxy Resin]

The composition for forming an electroless plating undercoat of the present invention may further contain an epoxy resin. The epoxy resin is a crosslinkable compound, and can be crosslinked by an epoxy group in the resin and cured. The predetermined amount of epoxy resin imparts excellent heat resistance and adhesiveness to the electroless plating undercoat.

Examples of the epoxy resin include a phenolic epoxy resin, a phenolic novolac epoxy resin, a cresol novolac epoxy resin, a dicyclopentadiene epoxy resin, a bisphenol epoxy resin, and a naphthalene epoxy resin. Among these, a dicyclopentadiene type epoxy resin, a bisphenol type epoxy resin, and a naphthalene type epoxy resin are preferable.

Examples of the dicyclopentadiene epoxy resin include HP4710 and HP7200HH, HP7200H, HP7200 made by DIC Corporation. Examples of naphthalene-type epoxy resins include HP4710 manufactured by DIC Corporation.

The glass transition temperature of the epoxy resin is preferably 60 to 110° C., more preferably 70 to 105° C., and still more preferably 75 to 100° C.

In the case of forming a undercoat using the composition for forming an electroless plating undercoat containing an epoxy resin, the glass transition temperature of the epoxy resin is in the above range, whereby the heat resistance and the thermal shock resistance of the undercoat can be improved.

By applying a composition in which an epoxy resin having the above glass transition temperature is mixed with a conductive polymer such as a polyaniline complex to a substrate to form a plating undercoat, excellent adhesiveness to the substrate and the plating coating film is exhibited in a heat resistance test and a thermal shock test alter electroless plating. This is considered to be because the addition of the epoxy resin having the above glass transition temperature increases the coating film strength and adhesion strength.

The amount of the epoxy resin In the composition for forming an electroless plating undercoat of the present invention is preferably from 0.2 to 30 parts by mass, more preferably from 0.5 to 15 parts by mass, and still more preferably from 0.7 to 10 parts by mass based on the total 100 parts by mass of the components (A) to (C).

On the other hand, the composition for forming an electroless plating undercoat of the present invention may have a small amount of epoxy resin, for example, it may be configured to be 1% by mass or less, 0.5% by mass or less, or 0.1% by mass or less, or the epoxy resin may not be included.

[Phenolic Compound]

When the composition for forming an electroless plating undercoat of the present invention contains a polyaniline complex as a conductive polymer, the composition may further contain a phenolic compound having an effect of improving electrical conductivity as a part of the polyaniline complex. The phenolic compound is not particularly limited as long as it is a compound having a phenolic hydroxyl group. The compound having a phenolic hydroxyl group is a compound having one phenolic hydroxyl group, a compound having a plurality of phenolic hydroxyl groups, and a polymer compound composed of a repeating unit having one or a plurality of phenolic hydroxyl groups.

As the phenolic compound, a known compound can be appropriately used.

[Heat Resistance Stabilizer]

The composition for forming an electroless plating undercoat of the present invention may further contain a heat resistance stabilizer when the composition contains a polyaniline complex as a conductive polymer.

The heat resistance stabilizer is an acidic substance or a salt of an acidic substance, and the acidic substance may be an organic acid (an acid of an organic compound) or an inorganic acid (an acid of an inorganic compound). The conductive polymer layer may also include a plurality of heat resistance stabilizers.

Other Components

The composition for forming an electroless plating undercoat of the present invention may further contain additives such as other resins, inorganic materials, curing agents, plasticizers, organic conductive materials, and the like.

Examples of the other resin include a binder substrate, a matrix substrate, and the like.

As specific examples of the other resins, polyolefin such as polyethylene and polypropylene; chlorinated polyolefin, polystyrene, polyester, polyamide, polyacetal, polyethylene teraphthalate, polycarbonate, polyethylene glycol, polyethylene oxide, polyacrylic acid, polyacrylic acid ester, polymethacrylic acid ester and polyvinyl alcohol can be given.

Instead of the resin, a thermosetting resin such as a phenolic resin or a melamine resin, or a precursor capable of forming the thermosetting resin may be included together with the resin.

The inorganic material is added in order to improve strength, surface hardness, dimensional stability and other mechanical properties, or to improve electrical properties such as conductivity. Specific examples of the inorganic material include silica (silicon dioxide), titania (titanium dioxide), alumina (aluminum oxide), Sn-contain $In_2O_3$ (ITO), Zn-containing $In_2O_3$, a co-substituted compound of $In_2O_3$ (an oxide in which a tetravalent element and a divalent element are substituted with trivalent In), Sb-containing $SnO_2$ (ATO), ZnO, Al-containing ZnO (AZO), Ga-containing ZnO (GZO), and the like.

The curing agent is added in order to improve strength, surface hardness, dimensional stability and other mechanical properties, for example. As specific examples of the curing agent, a heat curing agent such as a phenol resin, and a light curing agent composed of an acrylate-based monomer and a photopolymerization initiator can be given, for example.

A plasticizer is added in order to improve mechanical properties such as tensile strength, bending strength or the like, for example.

As specific examples of a plasticizer, phthalic acid esters or phosphoric acid esters can be given, for example.

Examples of the organic conductive material include carbon materials such as carbon blacks, carbon nanotubes, and the like.

[Electroless Plating Undercoat]

The electroless plating undercoat (layer) of the present invention can be formed from the composition for forming an electroless plating undercoat of the present invention described above. The thickness of the electroless plating undercoat obtained by drying the composition for forming an electroless plating undercoat is preferably 0.1 μm or more, more preferably 0.2 μm or more. When the film thickness is less than 0.1 μm, the adhesion between the substrate and the plated film cannot be maintained, so that the substrate and the plated film are easily peeled off. In addition, there is a possibility that the number of regions in which Pd metal is not supported increases, and there is a possibility that the number of regions in which electroless plating is not performed increases.

The upper limit of the film thickness is not particularly limited, but is, for example, 100 μm or less, 20 μm or less, or 10 μm or less.

[Method for Manufacturing Electroless Plating Undercoat]

The method for manufacturing the electroless plating undercoat of the present invention uses the composition for forming the electroless plating undercoat of the present invention. The present manufacturing method is not particularly limited as long as the composition for forming an electroless plating undercoat of the present invention is used, and for example, a coating method or the like in which the composition for forming an electroless plating undercoat of the present invention is coated on a substrate by a bar coating method and dried can be given.

[Plating Stacked Body]

The plating stacked body of the present invention includes a substrate, the above-mentioned electroless plating undercoat, and an electroless plating layer containing a metal, and the electroless plating layer and the electroless plating undercoat are in contact with each other.

The FIGURE is a schematic diagram showing a layer configuration of an embodiment of a plating stacked body of the present invention.

The plating stacked body 1 includes an electroless plating undercoat 20 and an electroless plating layer 30 stacked in this order on a substrate 10.

The plating stacked body of the present invention can be manufactured by a method for manufacturing the plating stacked body of the present invention, which will be described later.

[Substrate]

The substrate is not particularly limited, and may be a metal, an inorganic material (ceramics, glass or the like), or a resin. In addition, a substrate in which a metal is completely covered with a resin, a composite material of an inorganic material and a resin (for example, FRP, a glass epoxy composite material), or the like may be used. Examples of the resin include polycarbonate resin, acrylic resin, nylon resin, polyimide resin, polyester resin, styrene resin, phenolic resin, and PPS (polyphenylene sulfide) resin.

As a specific example of the substrate, for example, an easily bonded PET (A4300 manufactured by Toyobo Co., Ltd.) can be cited.

[Electroless Plating Layer]

Examples of the metal species of the electroless plating layer include copper, nickel, cobalt palladium, silver, gold, platinum and tin. In addition to these, an element such as phosphorus, boron, or iron may be contained. The forming method is as described later.

[Method of Manufacturing Plating Stacked Body]

The method of manufacturing a plating stacked body of the present invention includes a step of forming an electroless plating undercoat on a substrate using the composition for forming an electroless plating undercoat of the present invention, and a step of forming an electroless plating layer containing a metal on the electroless plating undercoat.

The formation of the electroless plating undercoat can be performed by the above-described method for manufacturing the electroless plating undercoat.

It is preferable to perform a degreasing step after forming the undercoat and before forming the electroless plating layer.

In the degreasing step, the surface of the electroless plating undercoat is degreased and cleaned with a solvent such as a surfactant or alcohol to improve the wettability.

As the surfactant, an anionic, cationic, or nonionic surfactant can be appropriately used, and a cationic surfactant is preferable. When a cationic surfactant is used, it is diluted to 1 to 3% with, for example, ion-exchanged water.

After the formation of the electroless plating undercoat, preferably after the degreasing step, it is generally preferable to bring the Pd compound solution into contact with the electroless plating undercoat in order to support the Pd metal (catalyst metal) responsible for the catalytic action of the electroless plating on the undercoat.

When the Pd compound solution is contacted, the conductive polymer such as the polyaniline complex adsorbs Pd ions, and the Pd ions are reduced to Pd metal by its reducing action. If the Pd is not reduced, that is, it is not Pd in a metallic state, the catalytic action in the electroless plating does not occur.

The amount of Pd deposited per unit area (including Pd ions and Pd metals) is preferably 1.7 μg/cm$^2$ or more, and more preferably 2.5 μg/cm$^2$ or more.

As the Pd compound, palladium chloride is preferable. Hydrochloric acid is generally used as the solvent. However, Pd may be present in an aqueous solution in an ionic state, and is not limited to an aqueous hydrochloric acid solution. Examples of the Pd compound solution include 0.02% palladium chloride-0.01% aqueous hydrochloric acid solution (pH3).

The contact temperature with the Pd compound solution is usually 20 to 50° C., preferably 30 to 40° C., and the contact time is usually 0.1 to 10 minutes, preferably 1 to 5 minutes.

Next, in order to form a metal-containing layer (plating layer) on the undercoat, the substrate obtained above is contacted with an electroless plating solution. When the undercoat and the electroless plating solution come into contact with each other, the supported Pd metal acts as a catalyst, and a plating layer is formed on the undercoat.

Examples of the metal species contained In the electroless plating solution include copper, nickel, cobalt, palladium, silver, gold, platinum, tin, and the like as described above. In addition to these, an element such as phosphorus, boron, or iron may be contained.

The contact temperature with the electroless plating solution differs depending on the type of the plating bath and thickness, but is, for example, about 20 to 50° C. in the case of a low temperature bath and 60 to 90° C. In the case of a high temperature bath.

The contact time with the electroless plating solution also differs depending on the type of the plating bath and thickness, but is, for example, 1 to 120 minutes. It is also possible to provide only electroless plating, or to provide a metal thin film by electroless plating, and then to provide a metal film of the same kind or different kind by electrolytic plating.

EXAMPLES

Production Example 1

[Preparation of Polyaniline Complexes]

A solution obtained by dissolving 37.8 g of "Aerosol OT" (sodium di-2-ethylhexylsulfosuccinate) (AOT) and 1.47 g of "Solvon T-20" (manufactured by Toho Chemical Co., Ltd.), which is a nonionic emulsifier having a polyoxyethylene sorbitan fatty acid ester-structure, in 600 mL of toluene was placed in a separable flask of a 6 L placed under a nitrogen-gas stream, and further 22.2 g of aniline was added to this solution. Then 1800 mL of 1 M phosphoric acid was added to the solution and the solution with two liquid phases of toluene and water was cooled to 5° C.

When the internal temperature of the solution reached 5° C., stirring was carried out at 390 rotations per minute. A solution of 65.7 g ammonium persulfate in 600 mL of 1 M phosphoric acid was added dropwise over 2 hours using a dropping funnel. The reaction was carried out for 18 hours from the start of the dropwise while maintaining the internal temperature of the solution at 5° C. Thereafter, the reaction temperature was raised to 40° C. and the reaction was continued for 1 hour. Thereafter, the mixture was allowed to stand and the toluene phase was separated. 1500 mL of toluene was added to the obtained toluene phase, washed once with 500 mL of 1 M phosphoric acid and three times with 500 mL of ion-exchanged water, the toluene phase was separated by standing, and concentrated for adjusting the concentrations to obtain 900 g of polyaniline complex toluene solution. The polyaniline complex concentration of the polyaniline complex toluene solution was 5.7% by mass.

Production Example 2

The polyaniline complex toluene solution obtained in Production Example 1 was dried in a water bath at 60° C. under reduced pressure to obtain a polyaniline complex (powder) of 51.3 g.

The weight average molecular weight of the polyaniline molecules in this polyaniline complex was 72,000 g/mol, and the molecular weight distribution was 2.0.

Example 1

[Preparation of Composition for Forming Electroless Plating Undercoat]

Polyester polyol resins (TP-219, manufactured by Nippon Synthetic Chemical Industries, Ltd., weight average molecular weight 3,000, Tg: 40° C., hydroxyl value: 55) 1.35 g, and blocked isocyanate compound solutions (MF-K60B, manufactured by Asahi Kasei Corporation, active NCO % (wt %)=6.4%, non-volatile component concentrations: 60% by mass, curing temperature: 90° C., hereinafter abbreviated as "MF-K60B") 0.86 g (non-volatile component: 0.52 g) were dissolved in a mixture of tetralin (manufactured by Kanto Chemical Co., Ltd.) 10.90 g, 2-butoxy-2-ethoxyethanol (manufactured by Wako Purl Pharmaceutical Industries, Ltd.) 8.18 g, and 1,3-dimethylimidazolidinone (manufactured by Wako Purl Pharmaceutical Industries, Ltd.) 2.73 g. After confirming the dissolution of the polyester polyol resin, 2.48 g of the polyaniline complex powder obtained In Production Example 2 was added and dissolved to obtain a composition (the composition for forming an electroless plating undercoat). The composition and the like of the composition are shown in Table 1.

[Manufacturing of Plating Stacked Bodies]
(Printing and Coating Processes)

The obtained composition was applied to a polyimide resin film (Kapton 300H, manufactured by Toray Corporation) using a bar coater (No. 16). The coated film was dried and cured at 150° C. for 30 minutes to form a plating undercoat (electroless plating undercoat). The film thickness of the plating undercoat was measured by a stylus type film thickness meter. The film thickness is shown In Table 2. The polyimide resin film on which the plated undercoat was formed was cut into 50 mm×100 mm to form test pieces.
(Degreasing Process)

The test piece was immersed in a 2.5% by mass aqueous solution of a surfactant (Ace Clean, manufactured by Okuno Pharmaceutical Co., Ltd.) at 55° C. for 5 minutes. Thereafter, the surface of the test piece was washed with running water, and then immersed in a 10% by mass aqueous solution of sodium bisulfite at 60° C. for 5 minutes. Further, the surface of the test piece was washed with running water to degrease the surface thereof.
(Pd Supporting Process)

The entire test piece after the degreasing treatment was immersed in a 20-fold diluted solution of a catalytic treatment agent activator (aqueous solution of an acidic palladium hydrochloric acid compound, manufactured by Okuno Pharmaceutical Co., Ltd.) at 30° C. for 5 minutes to perform a metal Pd supporting treatment.
(Plating Layer Forming Process)

The test piece after the Pd supporting treatment was subjected to plating treatment at 60° C. for 60 minutes using an electroless copper-plating solution (Sulcup ELC-SP, manufactured by C.Uyemura & Co., Ltd.) to form a plating layer, followed by washing with flowing water and drying with warm air (80° C.) to obtain a plating stacked body.
[Evaluation of Plating Stacked Body]

The obtained plating stacked body was evaluated as follows. The results are shown in Table 2.
(Adhesion)

The plated layer of the plating stacked body was subjected to a cross-cut test. Specifically, lattice-shaped scratches of 2 mm intervals were applied by cutters to reach the substrate according to the JIS5600-5-6, cellotape (registered trademark) (manufactured by Nichiban Ltd.) was attached, and peeling was performed at 90° angles to observe whether or not peeling (including peeling between the substrate and the plating undercoat, breaking of the plating undercoat, and peeling between the plating undercoat and the plating layer) occurred, and it was determined as follows.

◯: No peeling was observed.

x: Peeling was observed.

[Heat Resistance]

The plated layer of the plating stacked body was contacted with a solder bath at 260° C. for 2 minutes to observe the presence or absence of change and was determined as follows.

⊚: No change was observed at the time of separation from the solder bath, and even if the surface was strongly rubbed immediately after separation from the solder bath, the plating layer was not peeled of.

◯: No change was observed at the time of separation from the solder bath, but when the surface was strongly rubbed immediately after separation from the solder bath, the plating layer peeled off.

Δ: At the time of separation from the solder bath, changes such as peeling and swelling were observed.

Examples 2 and 3

A plating stacked body was produced and evaluated in the same manner as in Example 1 except that the amount of each component of the composition for forming an electroless plating undercoat was changed as described in Table 1. The results are shown in Table 2.

Example 4

A composition was prepared in the same manner as in Example 1 except that "TP-249" (weight average molecular weight 16,000, Tg: 36° C., hydroxyl value: 5.5) manufactured by Nippon Synthetic Chemical Industries Co., Ltd. was used as the polyester polyol resin, and the amount of each component was changed as described in Table 1, and a plating stacked body was produced. The results are shown in Table 2.

Example 5

The amount of each component In the composition of Example 1 was changed as described in Table 1, and 5.69 g (nonvolatile component 1.70 g) of a urethane resin solution (MAU1008, manufactured by Dainichi Seika Kogyo Co., Ltd., a nonvolatile component concentration of 30% by mass) and an antifoaming agent (JA-750, manufactured by Jujo Chemical Co., Ltd.) were mixed to prepare a composition. The amount of the component (C) based on the total of the component (A), the component (C) and the urethane resin was 7.80% by mass.

The obtained composition was printed on a polyimide resin film (Kapton 300H, manufactured by Toray Ltd.) in a square shape (30 mm square) and a linear pattern (width: 0.1 mm, 0.5 mm and 5 mm, length: 100 mm each) using a screen printing machine. The printed material was dried and cured at 150° C. for 30 minutes to form a plating undercoat. The subsequent steps were performed in the same manner as in Example 1 to produce and evaluate a plating stacked body. The results are shown in Table 2.

Examples 6 to 8

A plating stacked body was produced and evaluated in the same manner as in Example 1 except that the amount of each component of the composition for forming an electroless plating undercoat film was changed as described in Table 1. The results are shown in Table 2.

Comparative Example 1

A plating stacked body was produced and evaluated in the same manner as in Example 5 except that the amount of each component of the composition for forming an electroless plating undercoat film was changed as described in Table 1. The results are shown in Table 2.

TABLE 1

| | Component (A) | Component (B) | Component (C) | Solvent Tetralin | Solvent 2B2EEt* |
|---|---|---|---|---|---|
| Example 1 | 2.48 g | 1.35 g | 0.52 g | 10.90 g | 8.18 g |
| Example 2 | 2.52 g | 1.30 g | 0.59 g | 10.84 g | 8.13 g |
| Example 3 | 2.52 g | 1.45 g | 0.44 g | 10.90 g | 8.17 g |
| Example 4 | 1.87 g | 1.35 g | 0.05 g | 8.35 g | 6.26 g |
| Example 5 | 5.20 g | 1.70 g | 0.58 g | 3.53 g | 10.59 g |
| Example 6 | 2.53 g | 1.70 g | 0.19 g | 10.98 g | 8.23 g |
| Example 7 | 2.46 g | 1.55 g | 0.29 g | 11.00 g | 8.25 g |
| Example 8 | 2.51 g | 1.20 g | 0.68 g | 10.82 g | 8.12 g |
| Comparative Example 1 | 5.20 g | — | — | 2.54 g | 7.62 g |

| | Solvent 13DMIZ* | Other component urethane resin solution | Other component antifoaming agent | Proportion of component (B) and component (C) in non-volatile components | NCO/OH ratio |
|---|---|---|---|---|---|
| Example 1 | 2.73 g | — | — | 43% | 1.0 |
| Example 2 | 2.71 g | — | — | 43% | 1.2 |
| Example 3 | 2.72 g | — | — | 43% | 0.8 |
| Example 4 | 2.09 g | — | — | 43% | 1.0 |
| Example 5 | 3.53 g | 5.69 g | 0.20 g | 24% | 0.9 |
| Example 6 | 2.74 g | — | — | 43% | 0.3 |
| Example 7 | 2.75 g | — | — | 43% | 0.5 |
| Example 8 | 2.71 g | — | — | 43% | 1.5 |
| Comparative Example 1 | 2.55 g | 13.30 g | 0.20 g | 0% | — |

The "Proportion of component (B) and component (C) in non-volatile components" indicats that the mass proportion of the total of the component (B) and the component (C) based on the total of the nonvolatile components in the composition for forming an electroless plating undercoat.
The "NCO/OH ratio" indicates that the molar ratio of the isocyanate group in the component (C) based on the hydroxyl group in the component (B).
*2B2EEt: 2-butoxy-2-ethoxyethanol, 13DMIZ: 1,3-dimethylimidazolidinone

TABLE 2

|  | Film thickness of plating undercoat | Adhesion | Heat resistance |
| --- | --- | --- | --- |
| Example 1 | 4.5 μm | ○ | ◎ |
| Example 2 | 4.9 μm | ○ | ◎ |
| Example 3 | 4.6 μm | ○ | ◎ |
| Example 4 | 5.6 μm | ○ | ◎ |
| Example 5 | 4.7 μm | ○ | ◎ |
| Example 6 | 5.0 μm | ○ | ○ |
| Example 7 | 5.5 μm | ○ | ○ |
| Example 8 | 4.6 μm | ○ | ○ |
| Comparative Example 1 | 4.9 μm | ○ | Δ |

Example 9

[Preparation of Composition for Forming Electroless Plating Undercoat]

8.45 g of the polyaniline complex powder obtained in Production Example 2 was dissolved in a mixed solvent consisting of 11.80 g of 2-butoxy-2-ethoxyethanol (manufactured by Wako Pure Chemical Industries, Ltd.) and 5.50 g of an aromatic solvent (#200 Delayed Solvent, manufactured by Jujo Chemical Co., Ltd.). Then, 8&70 g (nonvolatile component 4.00 g) of polyester polyol resin solution (PL2 Medium, manufactured by Jujo Chemical Co., Ltd., hydroxyl value: 3.5), 0.87 g (non-volatile component 0.77 g) of blocked isocyanate compound solution (JA-980, manufactured by Jujo Chemical Co., Ltd., effective NCO % (wt %)=12.5%, curing temperature: 150° C.), 6.10 g (non-volatile component 1.83 g) of urethane resin solution (MAU1008), and 0.14 g of defoamer (JA-750) were added In this order and mixed uniformly to obtain a composition (the composition for forming an electroless plated undercoat). The composition and the like of the composition are shown in Table 3.

[Manufacturing of Plating Stacked Bodies]
(Printing and Coating Processes)

The prepared compositions were printed on a polyimide resin film (Kapton 300H, manufactured by Toray Ltd.) using a screen printing machine (DP-320, manufactured by Neurong Precision Industries Co., Ltd.) and a screen plate (250 mesh, 10 μm emulsion thickness, and 50 mm×100 mm of rectangle print patterns). The coated film was dried and cured at 150° C. for 30 minutes to form a plating undercoat (electroless plating undercoat).

The portion on which the electroless plating undercoat was printed was cut out to obtain a test piece.

(Degreasing Process)

The test piece was immersed in a 5.0% by mass aqueous solution of a surfactant (Ace Clean, manufactured by Okuno Pharmaceutical Co., Ltd.) at 60° C. for 5 minutes. Thereafter, the surface of the test piece was washed with running water, and then immersed in a 10% by mass aqueous solution of sodium bisulfite at 60° C. for 5 minutes. Further, the surface of the test piece was washed with running water to degrease the surface thereof.

(Pd Supporting Process)

The entire test piece after the degreasing treatment was immersed in a 20-fold diluted solution of a catalytic treatment agent activator (aqueous solution of an acidic palladium hydrochloric acid compound, manufactured by Okuno Pharmaceutical Co., Ltd.) at 30° C. for 5 minutes to perform a metal Pd supporting treatment (Plating Layer Forming Process)

The test piece after the Pd supporting treatment was subjected to a plating treatment using an electroless copper plating solution (TSP-810 electroless copper, manufactured by Okuno Pharmaceutical Co., Ltd.) at 55° C. for 60 minutes to form a plating layer, and then washed In flowing water and dried in warm air (80° C.) to obtain a plating stacked body.

The obtained plating stacked body was evaluated in the same manner as in Example 1. The results are shown in Table 4.

Example 10

A composition for forming an electroless plating undercoat was prepared In the same manner as in Example 9 except that the solvent in which the polyaniline complex powder was dissolved was changed to that described in Table 3. A plating stacked body was produced and evaluated in the same manner as in Example 9. The results are shown in Table 4.

Example 11

[Preparation of Composition for Forming Electroless Plating Undercoat]

4.80 g of polyaniline complex powder was dissolved in a mixed solvent consisting of 0.40 g of aromatic solvent (#200 slow drying solvent), 9.00 g of dipropylene glycol monopropyl ether (manufactured by Wako Pure Chemical Industries, Ltd.) and 6.00 g of γ-butyrolactone (manufactured by Wako Pure Chemical Industries, Ltd.). Then, 11.00 g (non-volatile component 6.06 g) of polyester polyol resin solution (PL2 medium), 1.10 g (non-volatile component 0.97 g) of blocked isocyanate compound solution (JA-980), 7.60 g (non-volatile component 2.28 g) of urethane resin solution (MAU1008), and 0.10 g of antifoaming agent (JA-750) were added in this order and mixed uniformly to obtain a composition (the composition for forming an electroless plating undercoat). The composition and the like of the composition are shown in Table 3.

[Manufacture and Evaluation of Plating Stacked Bodies]

A plating stacked body was produced and evaluated in the same manner as in Example 9. The results are shown in Table 4.

Example 12

[Preparation of Composition for Forming Electroless Plating Undercoat]

6.45 g of polyaniline complex powder was dissolved in a mixed solvent consisting of 0.26 g of aromatic solvent (#200 slow drying solvent), 8.40 g of dipropylene glycol monopropyl ether, and 8.64 g of γ-butyrolactone. Then, 8.70 g (nonvolatile component 4.00 g) of a polyester polyol resin solution (PL2 medium), 0.81 g (nonvolatile component 0.49 g) of a blocked isocyanate compound solution (MF-K60B), 6.10 g (nonvolatile component 1.83 g) of a urethane resin solution (MAU1008), and 0.14 g of an antifoaming agent (JA-750) were added in this order and mixed uniformly to obtain a composition (the composition for forming an electroless plating undercoat). The composition and the like of the composition are shown In Table 3.

[Manufacture and Evaluation of Plating Stacked Bodies]

A plating stacked body was produced and evaluated in the same manner as in Example 9. The results are shown in Table 4.

Example 13

[Preparation of Composition for Forming Electroless Plating Undercoat]

6.45 g of polyaniline complex powder was dissolved In a mixed solvent consisting of 0.26 g of aromatic solvent (#200 slow drying solvent), 8.40 g of dipropylene glycol monopropyl ether, and 8.64 g of γ-butyrolactone. Then, 8.70 g (nonvolatile component 4.00 g) of polyester polyol resin solution (PL2 medium), 0.65 g (nonvolatile component 0.46 g) of blocked isocyanate compound solution (SBB-70P, manufactured by Asahi Kasaei Corporation, active NCO % (wt %)=10.3%, curing temperature: 110° C.), 6.10 g (non-volatile component 1.83 g) of urethane resin solution (MAU1008), and 0.14 g of antifoaming agent (JA-750) were added in this order and mixed uniformly to obtain a composition (the composition for forming an electroless plating undercoat). The composition and the like of the composition are shown in Table 3.

[Manufacture and Evaluation of Plating Stacked Bodies]

A plating stacked body was produced and evaluated in the same manner as in Example 9. The results are shown in Table 4.

Example 14

[Preparation of Composition for Forming Electroless Plating Undercoat]

6.45 g of polyaniline complex powder was dissolved in a mixed solvent consisting of 11.80 g of 2-butoxy-2-ethoxyethanol and 4.50 g of aromatic solvent (#200 slow drying solvent). Then, 8.70 g (nonvolatile component 4.00 g) of a polyester polyol resin solution (PL2 medium), 1.31 g (nonvolatile component: 1.15 g) of a blocked isocyanate compound solution (JA-980), 6.10 g (non-volatile component: 1.83 g) of a urethane resin solution (MAU1008), and 0.14 g of an antifoaming agent (JA-750) were added in this order and mixed uniformly to obtain a composition (the composition for forming an electroless plating undercoat). The composition and the like of the composition are shown in Table 3.

Example 15

[Preparation of Composition for Forming Electroless Plating Undercoat]

6.90 g of polyaniline complex powder was dissolved In a mixed solvent consisting of 0.26 g of aromatic solvent (#200 slow drying solvent), 8.40 g of dipropylene glycol monopropyl ether, and 8.64 g of γ-butyrolactone. Then, 2.15 g (nonvolatile component 1.05 g) of a polyester polyol resin solution (PL2 medium), 0.20 g (nonvolatile component 0.18 g) of a blocked isocyanate compound solution (JA-980), 15.10 g (nonvolatile component: 4.53 g) of a urethane resin solution (MAU1008), and 0.14 g of an antifoaming agent (JA-750) were added in this order and mixed uniformly to obtain a composition (the composition for forming an electroless plating undercoat). The composition and the like of the composition are shown in Table 3.

[Manufacture and Evaluation of Plating Stacked Bodies]

A plating stacked body was produced and evaluated in the same manner as in Example 9. The results are shown in Table 4.

Example 16

[Preparation of Composition for Forming Electroless Plating Undercoat]

6.45 g of polyaniline complex powder was dissolved in a mixed solvent consisting of 0.26 g of aromatic solvent (#200 slow drying solvent), 8.40 g of dipropylene glycol monopropyl ether, and 8.64 g of γ-butyrolactone. Then, 8.70 g (nonvolatile component 4.00 g) of a polyester polyol resin solution (PL2 medium), 2.17 g (nonvolatile component 1.30 g) of a blocked isocyanate compound solution (MF-K60B), 6.10 g (nonvolatile component 1.83 g) of a urethane resin solution (MAU1008), and 0.14 g of an antifoaming agent (JA-750) were added in this order and mixed uniformly to obtain a composition (the composition for forming an electroless plating undercoat). The composition and the like of the composition are shown in Table 3.

[Manufacture and Evaluation of Plating Stacked Bodies]

A plating stacked body was produced and evaluated In the same manner as in Example 9. The results are shown in Table 4.

TABLE 3

| | Component (A) | Component (B) | Component (C) | Solvent | | |
|---|---|---|---|---|---|---|
| | | | | 2B2EEt* | #200 slow drying solvent | DPGMPE* |
| Example 9 | 6.45 g | 4.00 g | 0.77 g | 11.80 g | 5.50 g | — |
| Example 10 | 6.45 g | 4.00 g | 0.77 g | — | 0.26 g | 8.40 g |
| Example 11 | 4.80 g | 5.06 g | 0.97 g | — | 0.40 g | 9.00 g |
| Example 12 | 6.45 g | 4.00 g | 0.49 g | — | 0.26 g | 8.40 g |
| Example 13 | 6.45 g | 4.00 g | 0.46 g | — | 0.26 g | 8.40 g |
| Example 14 | 6.45 g | 4.00 g | 1.15 g | 11.80 g | 4.50 g | — |
| Example 15 | 6.90 g | 1.05 g | 0.18 g | — | 0.26 g | 8.40 g |
| Example 16 | 6.45 g | 4.00 g | 1.30 g | — | 0.26 g | 8.40 g |

TABLE 3-continued

|  | Solvent γ-butyrolactone | Other component | | Proportion of component (B) and component (C) in non-volatile components | NCO/OH ratio |
| --- | --- | --- | --- | --- | --- |
|  |  | urethane resin solution | antifoaming agent |  |  |
| Example 9 | — | 6.10 g | 0.14 g | 36% | 4.8 |
| Example 10 | 8.64 g | 6.10 g | 0.14 g | 36% | 4.8 |
| Example 11 | 6.00 g | 7.60 g | 0.10 g | 46% | 4.8 |
| Example 12 | 8.64 g | 6.10 g | 0.14 g | 35% | 2.3 |
| Example 13 | 8.64 g | 6.10 g | 0.14 g | 35% | 2.9 |
| Example 14 | — | 6.10 g | 0.14 g | 38% | 7.2 |
| Example 15 | 8.64 g | 15.10 g | 0.14 g | 9.6% | 4.2 |
| Example 16 | 8.64 g | 6.10 g | 0.14 g | 39% | 6.1 |

The "Proportion of component (B) and component (C) in non-volatile components" indicats that the mass proportion of the total of the component (B) and the component (C) based on the total of the nonvolatile components in the composition for forming an electroless plating undercoat.
The "NCO/OH ratio" indicates that the molar ratio of the isocyanate group in the component (C) based on the hydroxyl group in the component (B).
*2B2EEt: 2-butoxy-2-ethoxyethanol, DPGMPE: dipropylene glycol monopropyl ether

TABLE 4

|  | Film thickness of plating undercoat | Adhesion | Heat resistance |
| --- | --- | --- | --- |
| Example 9 | 4.9 μm | ○ | ◎ |
| Example 10 | 4.8 μm | ○ | ◎ |
| Example 11 | 4.7 μm | ○ | ◎ |
| Example 12 | 4.8 μm | ○ | ◎ |
| Example 13 | 4.8 μm | ○ | ◎ |
| Example 14 | 4.9 μm | ○ | ○ |
| Example 15 | 4.2 μm | ○ | ○ |
| Example 16 | 4.7 μm | ○ | ○ |

INDUSTRIAL APPLICABILITY

The composition for forming an electroless plating undercoat of the present invention can be used for electroless plating.

While some embodiments and/or examples of the present invention have been described in detail above, those skilled In the art will readily make many changes to these illustrative embodiments and/or examples without materially departing from the novel teachings and advantages of the invention. Accordingly, many of these modifications are within the scope of the invention.

The patent documents mentioned in this specification and the content of the application serving as a basis of claiming the priority concerning the present application to the Paris Convention are all incorporated by reference.

The invention claimed is:

1. A composition for forming an electroless plating undercoat, the composition comprising:
   (A) a conductive polymer;
   (B) one or more resins selected from the group consisting of a polyester polyol resin and a polyether polyol resin; and
   (C) a polyisocyanate compound,
   wherein an amount of the component (B) is 10 to 65% by mass, based on a total amount of the components (A) to (C).

2. The composition according to claim 1, wherein a ratio of a total amount of the component (B) and the component (C) based on an amount of a nonvolatile component in the composition is 8 to 90% by mass.

3. The composition according to claim 1, wherein a molar ratio of an isocyanate group in the component (C) based on a hydroxyl group in the component (B) is 0.1 to 10.0.

4. The composition according to claim 1, wherein the component (C) is a blocked polyisocyanate compound.

5. The composition according to claim 1, further comprising a urethane resin.

6. The composition according to claim 5, wherein a ratio of an amount of the component (C) based on a total amount of the component (A), the component (C), and the urethane resin is more than 5% by mass.

7. The composition according to claim 1, further comprising an epoxy resin.

8. The composition according to claim 1, wherein the component (A) is a substituted or unsubstituted polyaniline.

9. The composition for forming an electroless plating undercoat according to claim 1, wherein the component (A) is a polyaniline complex in which a substituted or unsubstituted polyaniline is doped with a dopant.

10. The composition according to claim 9, wherein the dopant is an organic acid ion generated from a sulfosuccinic acid derivative represented by formula (III):

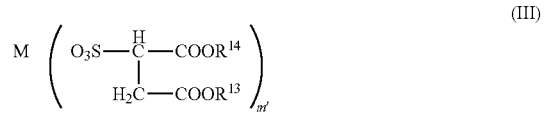

where M is a hydrogen atom, an organic radical, or an inorganic radical; m' is the valence of M; $R^{13}$ and $R^{14}$ are independently a hydrocarbon group or —$(R^{15}O)_rR^{16}$ group; each $R^{15}$ is independently a hydrocarbon group or a silylene group; each $R^{16}$ is independently a hydrogen atom, a hydrocarbon group, or $R^{17}{}_3Si$-group; r is an integer of 1 or more; each $R^{17}$ is independently a hydrocarbon group.

11. The composition according to claim 10, wherein the sulfosuccinic acid derivative is sodium di-2-ethylhexylsulfosuccinate or di-2-ethylhexyl sulfosuccinate.

12. The composition according to claim 1, further comprising a solvent.

13. An electroless plating undercoat obtained from the composition according to claim 1.

14. A plating stacked body comprising:
a substrate;
the electroless plating undercoat according to claim 13; and
an electroless plating layer containing a metal,
wherein the electroless plating layer and the electroless plating undercoat are in contact with each other.

15. The plating stacked body according to claim 14, wherein the metal is copper.

16. The plating stacked body according to claim 14, wherein the substrate comprises a resin.

17. The plating stacked body according to claim 16, wherein the substrate comprises a polycarbonate resin, a polyester resin, a polyimide resin, or a polyphenylene sulfide resin.

18. A method for manufacturing an electroless plating undercoat, the method comprising
preparing the electroless plating under coat using the composition according to claim 1.

19. A method of manufacturing a plating stacked body, the method comprising:
(i) forming an electroless plating undercoat on a substrate using the composition according to claim 1; and
(ii) forming an electroless plating layer containing a metal on the electroless plating undercoat.

20. The method according to claim 19, wherein in (ii), the electroless plating undercoat is made to support palladium, and then the electroless plating undercoat on which palladium is supported is contacted with an electroless plating solution to form the electroless plating layer.

21. The method according to claim 20, wherein the palladium is supported on the electroless plating undercoat by contacting the electroless plating undercoat with a palladium chloride solution.

22. The method according to claim 20, wherein the electroless plating solution contains one or more metals selected from the group consisting of Cu, Ni, Au, Pd, Ag, Sn, Co, and Pt.

* * * * *